United States Patent [19]

Rogers et al.

[11] Patent Number: 4,475,537

[45] Date of Patent: Oct. 9, 1984

[54] NONTRACKING PARABOLIC COLLECTOR APPARATUS

[75] Inventors: Mark C. Rogers, Baytown; Michael Gill, Sugarland, both of Tex.

[73] Assignee: Advanced Solar Systems, Midland, Tex.

[21] Appl. No.: 476,176

[22] Filed: Mar. 17, 1983

Related U.S. Application Data

[63] Continuation of Ser. No. 324,516, Nov. 24, 1981, abandoned, which is a continuation of Ser. No. 48,448, Jun. 14, 1979, abandoned.

[51] Int. Cl.³ .............................. F24J 3/02; G02B 5/10
[52] U.S. Cl. ................................... 126/438; 126/900; 350/293
[58] Field of Search ............... 126/438, 439, 443, 442, 126/448, 900, 417, 450; 136/89; 350/293

[56] References Cited

U.S. PATENT DOCUMENTS 3,049,055  8/1962  Tubbs ................................ 126/438
3,866,285  2/1975  Clark ............................... 126/438 X
3,987,781  10/1976  Nozik et al. ..................... 126/438 X
4,134,392  1/1979  Livermore et al. ................ 126/439
4,142,514  3/1979  Newton ............................. 126/438
4,153,042  5/1979  Tragert ............................. 126/441

FOREIGN PATENT DOCUMENTS 2712310  9/1978  Fed. Rep. of Germany ...... 126/438

Primary Examiner—Randall L. Green
Attorney, Agent, or Firm—Edwin E. Greigg

[57] ABSTRACT

A mirror collector having a generally parabolic surface terminating near the vertex in a circular or cylindrical curve, a collector tube composed of a clear glass outer tube for energy admission and for passing an inner fluid, the collector being generally eliptical in nature constructed of copper with a selective absorption coating for receiving heat and positioned so that the mirror concentrates substantially all incoming energy upon the central collector tube for providing a concentration factor of about four (4).

11 Claims, 2 Drawing Figures

NONTRACKING PARABOLIC COLLECTOR APPARATUS

CROSS REFERENCE TO PRIOR ART DISCLOSURES AND REFERENCES

This is a continuation of application Ser. No. 324,516, filed Nov. 24, 1981, now abandoned which is a continuation of Ser. No. 48,448 filed June 14, 1979, now abandoned.

There are no anticipatory nor relevant prior art references known to applicant, but the following were considered and are listed as follows:

| INVENTOR | PATENT NO. |
| --- | --- |
| Levi-Setti | 3,899,672 |
| Nozik | 3,957,029 |
| Mather | 4,002,160 |
| Bezborodko | 4,038,971 |
| Herman & Hoster | 4,091,793 |
| Bieringer & Mather | 4,091,796 |
| Heyen & Olinger | 4,119,083 |
| Radenkovic | 4,121,566 |

BRIEF SUMMARY OF THE INVENTION

The present invention relates to and describes the operating principles and fabrication of a nontracking compound parabolic solar collector. More particularly it relates to structures in which there are three main parts to the collector, (a) the mirror itself, (b) the collector tube, and (c) the solid state controller. Each are constructed and discussed arranged with respect to new operation, results, structural uses and improvements not heretofore apparently known.

A mirror design, (a) above, of the collector is based on the ability of a parabolic surface to concentrate all incoming radiation onto its focal point. This particular mirror is comprised of two identical parabolic sections rotated symmetrically off the optical axis of the collection trough. This parabolic curve is continuous to within about three degrees (3°) of the exact center of the trough at which point it seemingly degenerates to a circular curve. The focal point of each side of the curve is a point in the opposite side about one-half inch ($\frac{1}{2}$") above the bottom and about one-quarter inch ($\frac{1}{4}$") from the vertical center line of the curve. Thus a focal plane is created about one-half inch ($\frac{1}{2}$") from the bottom of the curve. By nesting a three fourth inch ($\frac{3}{4}$") diameter tube in the circular bottom of the curve, the mirrors concentrate all incoming energy onto the surface of the tube.

The fabrication of the mirror structure is a lamination of various densities of polymerized concrete. A negative mold of the curve is covered with thin aluminum sheet. Next, a high-density, quick-set plastic polymer and concrete mixture shown in actual composition in Table 'A' below and here identified as "Type A" is sprayed on it a layer three-eighths inch ($\frac{3}{8}$") thick and allowed to set. Next, the mold is filled with a low-density concrete fiberglas and glass bead aggregate shown in actual composition in Table 'B' below and here identified as "Type B", and allowed to dry. Finally, a cover layer of polymerized concrete shown in actual composition in Table 'C' below and here identified as "Type C" is sprayed on to form a damage and moisture resistant exterior surface. Once removed from the mold, the panel is fitted with the collector tubes, headers and low-iron glass cover plates.

A collector tube, (b) above, is composed of a clear glass outer tube for energy admission and to protect the inner fluid tube. The inner tube is in an eliptical copper tube which may have generally a vertical major axis and with a selective absorption coating to receive heat. This assembly is installed in the trough where inlet and outlet headers are attached. The mirror concentrates all incoming energy on the center tube giving a concentration factor of about four (4). The outer tube maintains even heat distribution and refocuses energy radiated from the fluid tube.

A microprocessor-based digital controller, (c) above, operates the system by constantly monitoring the hot and cold holding tank temperatures, the collector temperatures, and all tank levels. The controller is also connected through buffer stages to solenoid valves, relays for pump motor starters, and automatic switching to a backup system. By the addition of living area thermostats, sensors for outside temperature, and solar energy insulation, a complete automatic system provides improved functions using new structures and achieving new uses not previously known.

FIELD OF THE INVENTION

The purpose, advantage and feature of the invention is that it provides a concentrating solar collecting panel or panels constructed upon more or less a parabolic curve comprised of two identical halves made to approximate a straight parabolic curve and then which are arranged in mating relation to resemble a parabolic curve, each half of the trough composed of a paraboloid essentially and in which the bottom of the trough has disposed therein in nesting relation a circular or tubular collecting element or tube that will actually have heat absorbing fluid passing through it such as water, ethylene glycol, or a silicone mixture or the like such as any available super high temperature responsive fluid used in industrial applications. The axis of the circular collecting tube coalesces generally with a line formed by the focal point of the parabolic curves so that there is essentially created a focal plane disposed within the circular collecting tube. The curve comprising the parabolic surface is about 2-3 degrees off center at the bottom of the curve, and the contour of the curve may be computer plotted so that it achieves maximized focusing in the contour shaped structure of each half-curves. The circular collecting tube may be of glass having its diameter about $1\frac{1}{8}$ inches, about the size of a standard fluorescent tube and its center coalesces or coincides with the line of focal points. Inside the circular collecting tube there is a generally eliptical metal or copper tube that actually has the working fluid passing through it and is supported within the circular collecting tube by conventional means. The interior surface of the circular collecting tube is coated with a material for retroflecting or reflecting back into the tube all infrared radiation so that it is not lost into the parabolic surface and back out of the trough.

SUMMARY OF THE INVENTION

The object and objects of the invention are that it provides a new, improved and effective non-tracking parabolic collector of solar energy.

A further object of the invention is to provide a combination of a collector tube, a parabolic mirror surface and a metallic or copper tube of a configuration disposed at the focal point of the surface and receiving the energy that is transferred into heat received by a high energy work fluid such as glycol or silicone mixture so that it is carried to a heat exchange unit.

A further object of the invention is to provide a fabrication of a mirror structure of lamination of various substances so that it is long enduring while in situ and provides maximized efficiency of heat exchange from the solar energy to a high temperature responsive exchange of energy from solar energy to heat so that the heat can be processed in a heat exchange unit.

A further object of the present invention is to provide a collector tube composed of a clear glass outer tube for energy admission and in which an inner tube of metal of generally circular or eliptical configuration has a selective absorption coating for receiving heat and through which there passes a high heat responsive material sensitive to solar energy received therein and for conveying the heat to a heat exchange unit. The collector tube of glass may have its inner surface with or without a separate coating thereon for retroreflecting infrared and other forms of heat back onto the inner tube so that no heat is lost from the trough to its exterior after having been received for collection therein.

A further object of the invention is to provide an outer tube that maintains an even heat distribution and for refocusing energy radiated from the inner and fluid containing tube from the collector cylinder tube onto the inner tube.

BRIEF DESCRIPTION OF THE SEVERAL VIEWS OF THE DRAWINGS

The above and other objects and advantages of the invention will become apparent upon full consideration of the following detailed description and accompanying drawings in which.

DETAILED DESCRIPTION OF THE PREFERRED EMBODIMENT

Figure 1:
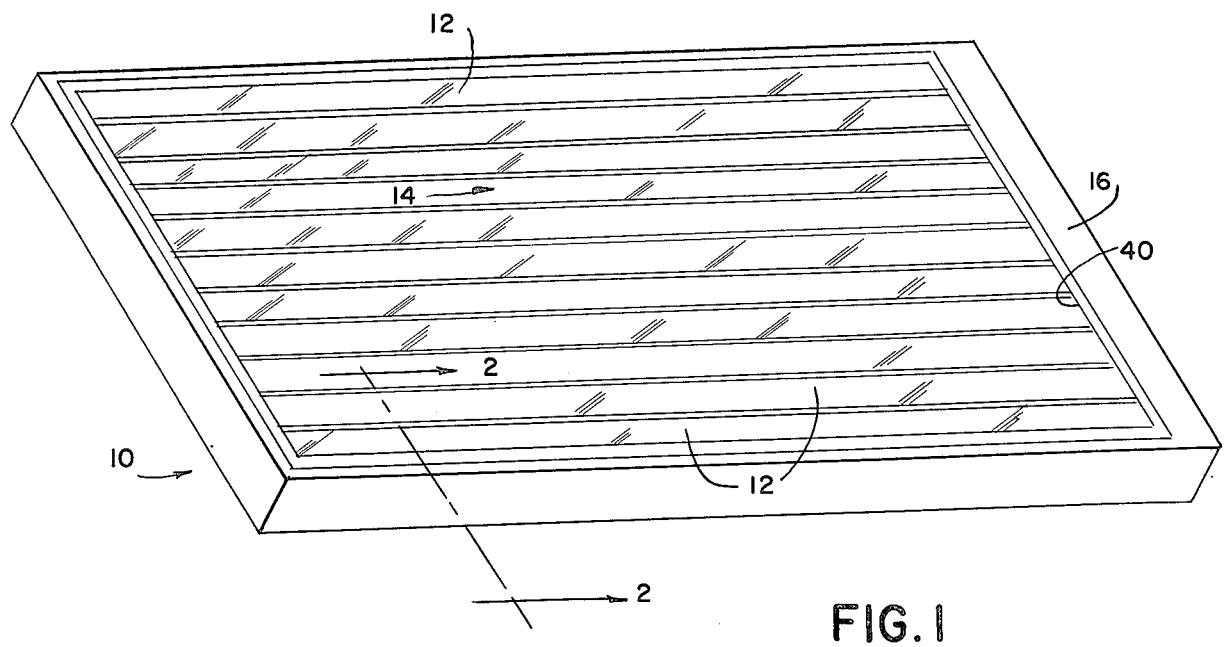
FIG. 1 is a generally perspective view of the non-tracking compound parabolic solar collectors forming a unit according to a preferred embodiment of the present invention.

Referringg now to the drawings there is shown a solar energy collection apparatus 10 for providing non-tracking parabolic collection of solar energy and including a series of troughs 12, 12, 12 arranged in an array 14 disposed in a manifold and support structure 16 forming an integral unit as shown in FIG. 1.

Figure 2:
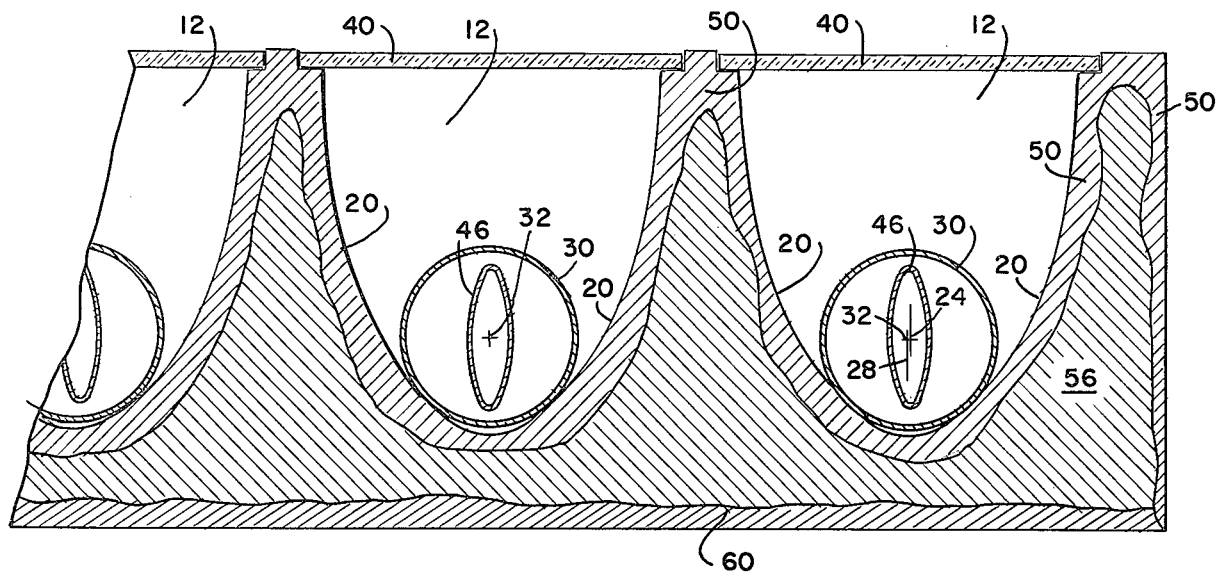
FIG. 2 is a cross sectional view taken along lines 2—2 of FIG. 1, but on an enlarged scale and showing features and details of the preferred embodiment of the invention.

The troughs 12, 12 are shown in more particular detail by the cross section arrangement of FIG. 2 which is taken along lines 2—2 of FIG. 1 described above. The troughs are comprised of mating half sections for example of two identical parabolic sections 20, 20 formed by being rotated symmetrically off an optical axis of the collection trough. The parabolic curve of each of the troughs is continuous to within two or three degrees of an exact center of the trough at which point the curve may degenerate into a circular curve, as shown toward the peripheral edge of the curve. The focal point 24 of each of the curves is at a general point as shown and is about, in the preferred embodiment, one-half inch above the bottom curvature of the trough 12 and is also found to be about $\frac{1}{4}$ inch from the vertical center line 28 of the curve or half section. Thus a focal plane is created proximate $\frac{1}{2}$ inch from the bottom of the curve and about $\frac{1}{4}$ inch either side of a vertical center line thereof. There is then inserted into the trough in nesting relation a heat entrapment collector cylinder 30 of glass and which extends throughout the length trough, the cylinder having an axis 32 that generally and approximately coincides with the line of focal points 24 extending througout the trough. The cylinder may be of any transparent material such as glass described above, and its inner surface may be coated with material for providing infrared light to be retroreflected back into the cylinder if it is not collected as will be described below. The trough in its conventional operation collects solar energy throughout its parabolic surface that passes within the trough and through a glass cover plate 40 so that it is directed toward the focal point 24, but should it pass through that point to the other side of the cylinder 30, it will not exhaust the confines of the cylinder but will be reflected back into the cylinder 30 due to the cylindrical inner surface.

Mounted within the central portion of the cylinder 30 is a metallic tube that is of a common length with the cylinder 30 and may be eliptically contoured along the vertical axis of the trough 12, the axis of the metallic tube 46 having its central point or axis encompassing both the line of focal points 24 and the axis 32 of the cylinder 30, and the metallic or inner tube 46 having sufficient radius for the conveyance of a working fluid passing therethrough. The working fluid is of glycol or a silicone mixture or any material of a super high temperature sensitive and responsive material so that upon impact of solar energy rays, the working fluid increases and absorbs heat and its temperature is correspondingly raised in response thereto for conveying the absorbed heat from the trough to a heat exchange unit (not shown).

The parabolic surfaces 20, 20 may be formed of a mirror parabolic structure and to provide sufficient support thereof there is a lamination of various densities polymerized concrete on its rear surface as shown in FIG. 2. The set of parabolic surfaces 20, 20 form a mold of the parabolic curve and is coated on its mirror surface with a thin aluminum sheet. Then a high-density, quickset plastic polymer and concrete mixture 50 is spray-coated onto the parabolic surface 20, 20 to a depth to about $\frac{3}{8}$ inches in thickness and is allowed to set. After the mixture 50 is allowed to harden, it is comprised of a mold that is filled with a low-density concrete fiberglas and glass bead aggregate 56 and is allowed to dry to a hardened state. At the conclusion of this step then a cover layer of polymerized concrete 60 forms a base structure and upon hardening it is then removed forming the panel that is inserted into the manifold and support equipment frame 16 described in FIG. 1 together with being fitted out with the collector tubes and cylinders 30, 40 headers, and the low-iron glass cover plate 40.

It is seen that the collector tube is comprised of a clear, transparent glass or similar material outer tube for energy transmission or admission therein for protecting the inner fluid tube by supporting it centrally disposed therein. The inner tube is an ordinarily constructed generally eliptical metal or copper tube having a vertical major axis with a selectively disposed absorption coating for the reception of heat and preventing heat from passing through the inner tube. This assembly is installed in the trough where inlet and outlet headers are attached. The mirror of the parabolic surface concentrates all incoming energy on the center tube giving a concentration factor of about four. The outer tube of cylindrical construction provides evenly distributed heat and distribution that provides essentially and resultantly refocuses energy radiated from the fluid tube.

Tables of material referred to above include the following details and tables A, B and C inclusive as follows:

TABLE 'A'

| Compound "Type A" | Ratios by Volume (Approximate) |
|---|---|
| Water | 1 Part |
| Ropflex | 1 Part |
| Portland Cement | 2 Parts |

TABLE 'B'

| Compound "Type B" | Ratios by Volume (Approximate) |
|---|---|
| Water | 1 Part |
| Ropflex | ½ Part |
| Portland Cement | 2 Parts |
| Glass Beads | 4 Parts |

TABLE 'C'

| Compound "Type C" | Ratios by Volume (Approximate) |
|---|---|
| Water | 1 Part |
| Ropflex | 2 Parts |
| Portland Cement | 3 Parts |
| Fiberglas chopped during spraying application | |

ROPFLEX is a tradename of Rohm-Haas for a water based, acrylic polymer, found similar to that used in commercial paint products of Sears, Roebuck & Co. under the tradename Sears Best.

Also within the broad and general concept of the invention there is seen to be provided a microprocessor-based digital controller for operating the system which constantly monitors the hot and cold holding tank temperatures, the collector temperatures, and all tank levels. A controller is also capable of being provided and connected through buffer stages to solenoid valves, relays for pump motor starters and automatic switching to a backup system. By the addition of living area thermostats, sensors for outside temperature and solar energy insulation, a complete and thoroughly automatic and automated system is available for use within the purview of the present invention.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. A solar energy collection apparatus having:
    a support;
    at least one trough in the support, said at least one trough having an internal reflective surface comprising two oppositely disposed truncated parabolic sections rotated away from its vertical axis to create a wide angle of acceptance opening, and a reflective circular face joining the ends of said two parabolic sections which are opposite said acceptance opening, said reflective surface being molded with said support, said internal reflective surface having a focal line to which said internal reflective surface reflects incident solar energy;
    a heat entrapment collector cylinder formed of glass which is vacuum sealed and nested in said at least one trough and extending substantially along the focal line of said reflective surface such that a portion of the trough engages the heat entrapment collector cylinder therein which permits thermal expansion of said collector cylinder; and
    at least one metallic tube mounted within the heat entrapment collector cylinder.

2. A solar energy collection apparatus as defined in claim 1, wherein the metallic tube contains a working fluid for the transfer of solar energy incident thereon.

3. A solar energy collection apparatus as defined in claim 2, wherein the internal reflective surface comprises in part a thin aluminum sheet molded to the support.

4. A solar energy collection apparatus as defined in claim 3, wherein the heat entrapment collector cylinder engages the two parabolic surfaces such that the heat entrapment collector cylinder is spaced from the circular face.

5. A solar energy collection apparatus as defined in claim 4, wherein the metallic tube is coated with a radiation absorption material to facilitate heat reception by the working fluid and said collector cylinder is coated on its inner surface with an infrared reflective material.

6. A solar energy collection apparatus as defined in claim 5, wherein the structure comprises a base of polymerized concrete which supports a low density concrete, fiberglass and glass bead aggregate material, into which the troughs are formed, wherein the troughs have a layer coating of a plastic polymer and concrete mixture.

7. A solar energy collection apparatus as defined in claim 6, also having a low-iron glass plate secured to cover each of the troughs opposite the circular face.

8. A solar energy collection apparatus as defined in claim 7, wherein the working fluid is an ethylene glycol mixture.

9. A solar energy collector as set forth in claim 8 in which said support includes a plurality of troughs therein.

10. A method of forming a solar energy collection apparatus which comprises
    forming a metallic reflective surface to include two parabolic sections which are rotated away from its vertical axis with a reflective circular face joining the two parabolic surfaces together at their inner end and forming a support for said reflective surface as follows:
    (1) applying a layer of plastic polymer cement mix over said reflective surface then allowing the polymer-cement mix to harden;
    (2) pouring a mixture of cement, fiberglass and glass beads onto said hardened layer of plastic polymer-cement mix and permitting said cement, fiberglass and glass bead mixture to harden, and
    (3) pouring a thin layer of cement mix over said hardened mixture of cement, fiberglass and glass beads,
        placing said reflective surface support in a frame, mounting a metallic tube coaxially within a heat entrapment collector cylinder,
        evacuating said heat entrapment collector cylinder, and placing said heat entrapment collector cylinder into said reflective surface with said metallic tube loosely supported along a focal line of said reflective surface.

11. A method as set forth in claim 10 which includes placing a glass cover over said reflective surface.

* * * * *